(12) United States Patent
Ryan (10) Patent No.: US 9,191,390 B1
(45) Date of Patent: Nov. 17, 2015

(54) SYSTEM, METHOD, AND COMPUTER PROGRAM FOR MANAGING USER ACCESS CREDENTIALS IN A COMPUTER NETWORK

(71) Applicant: Amdocs Software Systems Limited, Dublin (IE)

(72) Inventor: Patrick Garrett Ryan, Shoreline, WA (US)

(73) Assignee: Amdocs Software Systems Limited, Dublin (IE)

( * ) Notice: Subject to any disclaimer, the term of this patent is extended or adjusted under 35 U.S.C. 154(b) by 20 days.

(21) Appl. No.: 14/260,192

(22) Filed: Apr. 23, 2014

Related U.S. Application Data (60) Provisional application No. 61/820,730, filed on May 8, 2013.

(51) Int. Cl.
*H04L 29/06* (2006.01)

(52) U.S. Cl.
CPC ............ *H04L 63/10* (2013.01); *H04L 63/0884* (2013.01)

(58) Field of Classification Search
CPC .................................................. H04L 63/0884
USPC .............................................................. 726/5
See application file for complete search history.

(56) References Cited

U.S. PATENT DOCUMENTS

| | | | |
|---|---|---|---|
| 2010/0169963 A1* | 7/2010 | Kleinpeter et al. | 726/10 |
| 2011/0261964 A1* | 10/2011 | Kahler et al. | 380/286 |

FOREIGN PATENT DOCUMENTS

EP 1744518 A2 1/2007

OTHER PUBLICATIONS

Kamara, S. et al., "Cryptographic Cloud Storage," Proceedings of Financial Cryptography: Workshop on Real-Life Cryptographic Protocols and Standardization 2010, Jan. 2010, pp. 1-14.
Fleishman, G., "How to control the keys to your cloud storage castle," TechHive, Aug. 2, 2012, pp. 1-7.
Fleishman, G., "How to control the keys to your cloud storage castle," TechHive, Aug. 2, 2012, pp. 1-5, retrieved from http://www.techhive.com/article/2000251/how-to-control-the-keys-to-your-cloud-storage-castle.html.
Kamara, S. et al., "Cryptographic Cloud Storage," Proceedings of Financial Cryptography: Workshop on Real-Life Cryptographic Protocols and Standardization 2010, 2010, pp. 1-14, retrieved from http://research.microsoft.com/pubs/112576/crypto-cloud.pdf.

* cited by examiner

*Primary Examiner* — Longbit Chai
(74) *Attorney, Agent, or Firm* — Zilka-Kotab, PC (57) ABSTRACT

A system, method, and computer program product are provided for managing user access credentials in a computer network. In use, a Security Asset Repository (SAR) is maintained on a first computer connected to a network, the SAR being operable for storing user access credentials to resources on the network. Additionally, a first program residing on a second computer connected to the network is executed by a user, the user having first user access credentials for accessing the second computer. Responsive to executing of the first program, the SAR is accessed by the first program, by employing second user access credentials provided to the first program by the user. Responsive to accessing the SAR by the first program, the first program retrieves third user access credentials from the SAR, the third user access credentials being operable for accessing the SAR by a third computer. Responsive to retrieving the third user access credentials from the SAR, the first program executes a second program residing on the third computer connected to the network, and provides the third user access credentials to the second program. Responsive to providing the third user access credentials to the second program, the SAR is accessed by the second program by employing the third user access credentials, and the second program retrieves fourth user access credentials from the SAR, the fourth user access credentials being operable for accessing resources on the network other than the SAR.

20 Claims, 8 Drawing Sheets

SYSTEM, METHOD, AND COMPUTER PROGRAM FOR MANAGING USER ACCESS CREDENTIALS IN A COMPUTER NETWORK

CLAIM OF PRIORITY

This application claims the benefit of U.S. Provisional Application No. 61/820,730, filed May 8, 2013, the entire contents of which are incorporated herein by reference.

FIELD OF THE INVENTION

The present invention relates generally to providing access to security assets such as passwords, keys, and certificates, over a network, particularly in a network cloud environment.

BACKGROUND

A program requiring network access to a repository of security assets needs to obtain credentials that are required to authenticate to the repository. For interactive programs these can be obtained by prompting the user for the credentials, such as a password or key. For non-interactive programs, such as daemon programs running on server hosts, this becomes difficult.

Sometimes a hardware security module or smart card can be used to store the credentials, but a hardware based solution presents its own problems in terms of cost and hardware compatibility issues, and often requires a PIN to access the device that holds the key or password used to authenticate. Additionally, hardware based solutions may not be an option in a cloud environment. A common solution is to persist the credentials outside of the security asset repository, which undermines the point of having such a repository and creates additional security asset management problems.

There is thus a need for addressing these and/or other issues associated with the prior art.

SUMMARY

A system, method, and computer program product are provided for managing user access credentials in a computer network. In use, a Security Asset Repository (SAR) is maintained on a first computer connected to a network, the SAR being operable for storing user access credentials to resources on the network. Additionally, a first program residing on a second computer connected to the network is executed by a user, the user having first user access credentials for accessing the second computer. Responsive to executing of the first program, the SAR is accessed by the first program, by employing second user access credentials provided to the first program by the user. Responsive to accessing the SAR by the first program, the first program retrieves third user access credentials from the SAR, the third user access credentials being operable for accessing the SAR by a third computer. Responsive to retrieving the third user access credentials from the SAR, the first program executes a second program residing on the third computer connected to the network, and provides the third user access credentials to the second program. Responsive to providing the third user access credentials to the second program, the SAR is accessed by the second program by employing the third user access credentials, and the second program retrieves fourth user access credentials from the SAR, the fourth user access credentials being operable for accessing resources on the network other than the SAR.

DETAILED DESCRIPTION

Figure 1:
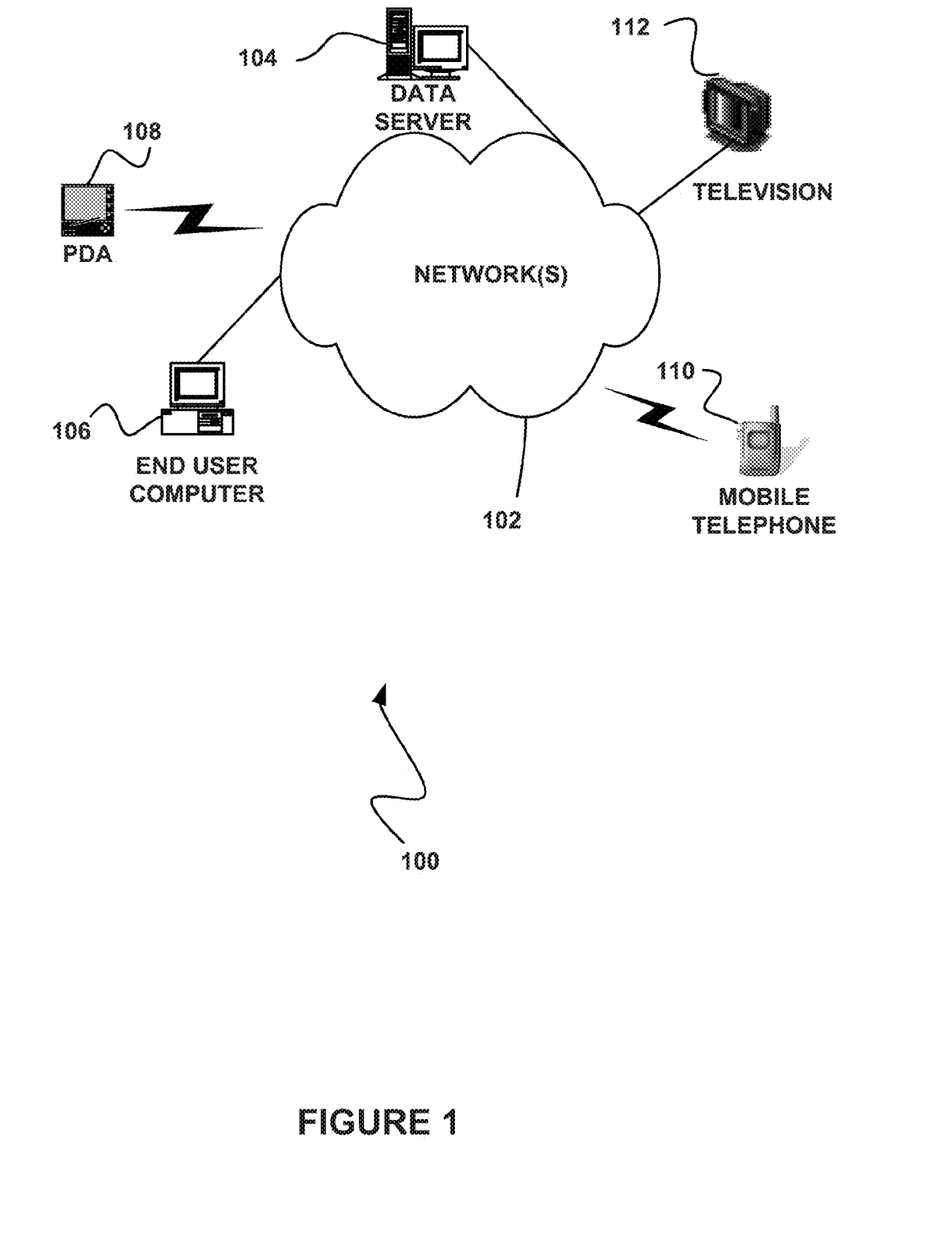
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
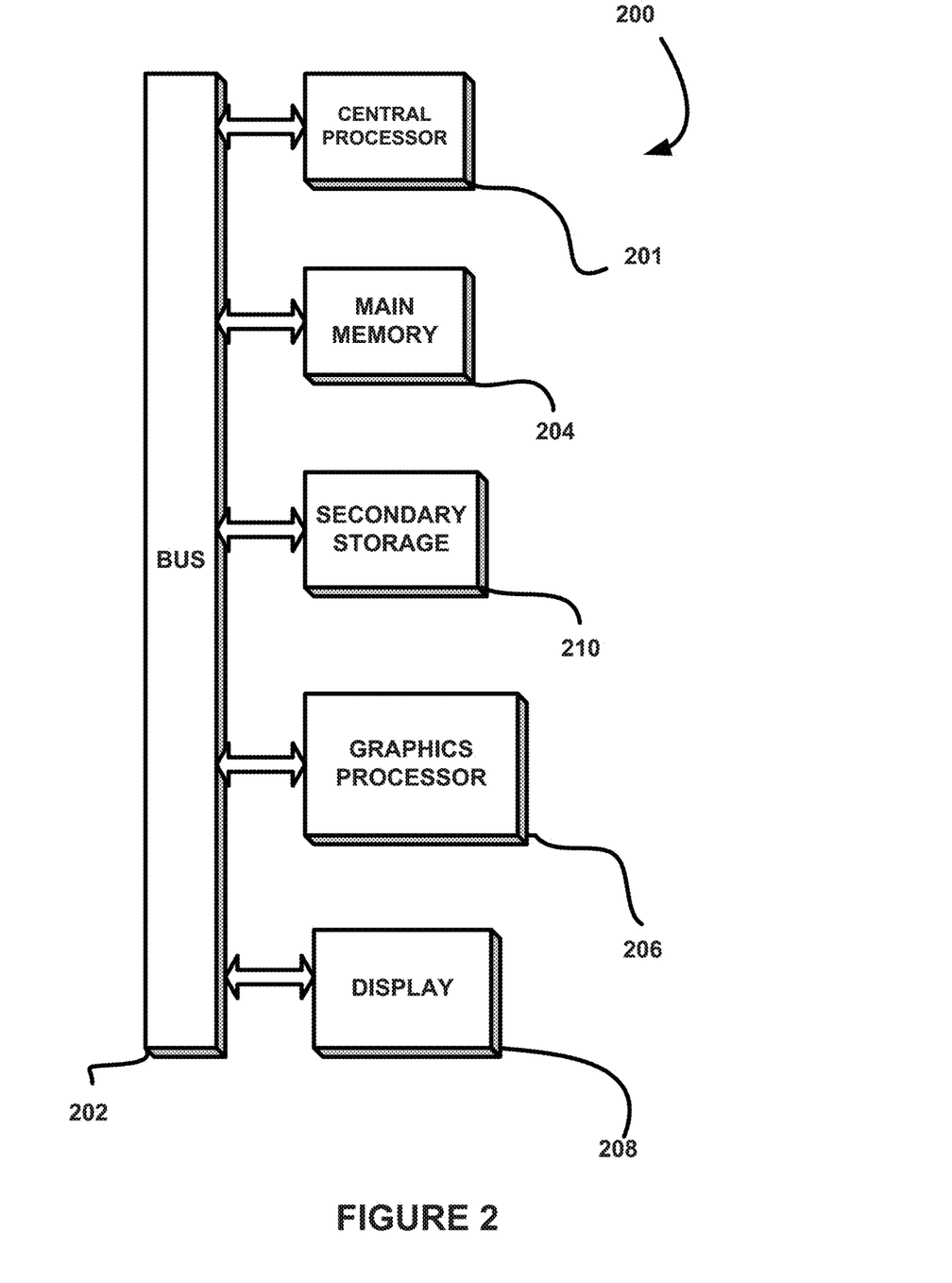
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example).

Memory 204, storage 210 and/or any other storage are possible examples of tangible computer-readable media.

Figure 3:
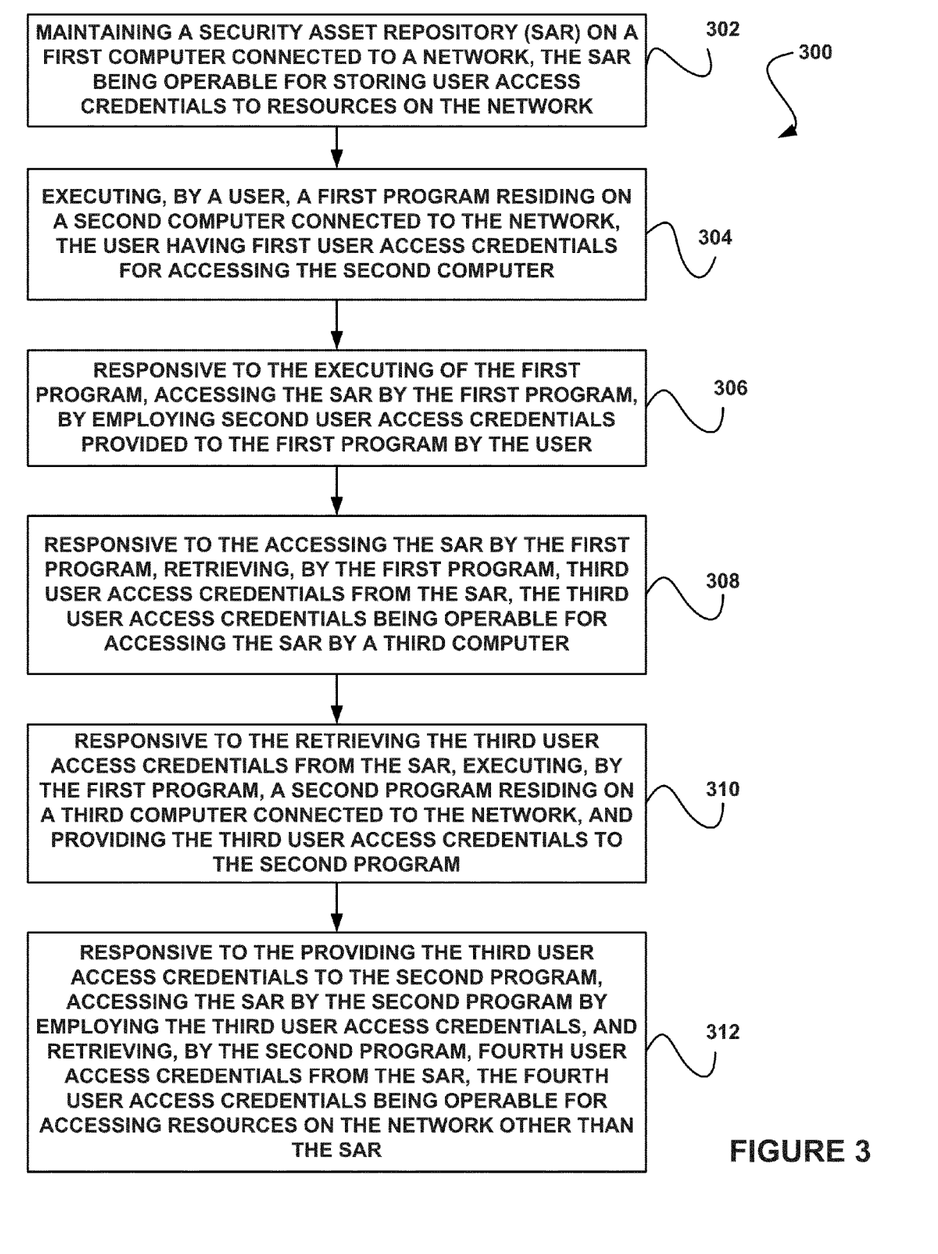
FIG. 3 illustrates a method for managing user access credentials in a computer network, in accordance with one embodiment.

FIG. 3 illustrates a method 300 for managing user access credentials in a computer network, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, a Security Asset Repository (SAR) is maintained on a first computer connected to a network, the SAR being operable for storing user access credentials to resources on the network. See operation 302. The SAR may include any type of repository/memory and may be capable of storing any type of user access credentials to resources on the network.

In one embodiment, the SAR may be associated with a Security Asset Service (SAS) corresponding to the first computer. The first computer may include any type of computing device. For example, in one embodiment, the first computer may include a server and/or host computer.

Furthermore, the network may include any type of network. For example, in one embodiment, the network may include a consumer telecommunication network.

As shown further in FIG. 3, a first program residing on a second computer connected to the network is executed by a user, the user having first user access credentials for accessing the second computer. See operation 304. The second computer may include any type of computing device.

Further, the first program may include any type of computer program. For example, in one embodiment, the first program may include a daemon management program.

Additionally, the first user credentials may include any credentials for accessing the second computer. For example, in one embodiment, the first user access credentials may include a username and/or password.

Responsive to executing of the first program, the SAR is accessed by the first program by employing second user access credentials provided to the first program by the user. See operation 306.

The second user access credentials may include any credentials for accessing the SAR. For example, in one embodiment, the second user access credentials may include a username and/or password.

Responsive to accessing the SAR by the first program, the first program retrieves third user access credentials from the SAR, the third user access credentials being operable for accessing the SAR by a third computer. See operation 308. The third computer may include any type of computing device.

Additionally, the third user credentials may include any credentials for accessing the third computer. For example, in one embodiment, the third user access credentials may include a public key, etc.

In one embodiment, retrieving the third user access credentials from the SAR may include retrieving a current key to use to encrypt requests associated with the second computer. Additionally, in one embodiment, retrieving the third user access credentials from the SAR may include retrieving an SAS certificate and a current key.

In this case, the second computer may validate the SAS certificate. Furthermore, the second computer may validate the current key. In one embodiment, the second computer may generate a first key pair, in response to retrieving the SAS certificate and the current key. In this case, the user may be provisioned at the first computer utilizing at least a portion of the first key pair.

Responsive to retrieving the third user access credentials from the SAR, the first program executes a second program residing on the third computer connected to the network, and provides the third user access credentials to the second program. See operation 310.

The second program may include any type of computer program. For example, in one embodiment, the second program may include a daemon. In the context of the present description, a daemon refers to any computer program that runs as a background process, rather than being under the direct control of an interactive user. Additionally, a daemon management program refers to any program capable of managing a daemon.

Responsive to providing the third user access credentials to the second program, the SAR is accessed by the second program by employing the third user access credentials, and the second program retrieves fourth user access credentials from the SAR, the fourth user access credentials being operable for accessing resources on the network other than the SAR. See operation 312.

The fourth user access credentials may include any access credentials capable of being utilized to access resources on the network other than the SAR. In one embodiment, the fourth user access credentials may include at least a public key.

In one embodiment, retrieving the fourth user access credentials from the SAR may include retrieving an SAS certificate and a current key. In this case, a second key pair may be generated, by the third computer, in response to retrieving the SAS certificate and the current key. As an option, a second user or the second program may be provisioned at the first computer utilizing at least a portion of the second key pair.

It should be noted that the user may be located at a physical location of the second computer. Further, the physical location of the second computer may be different than a physical location of the third computer, such that the user does not have physical access to the third computer.

In one embodiment, the method 300 may enable programs to authenticate themselves to a security asset repository without storing the necessary credentials outside of the security asset repository. This may be accomplished by integrating a user provisioning process into the program startup process. Once the user is provisioned, the program may use the provisioned user to remotely authenticate itself to the security asset repository over the network. The programs may include daemon programs, such as those running on server hosts, but may also include interactive programs as well.

In one embodiment, the user that is provisioned in the security asset repository may be based on a cryptographic key pair. In one embodiment, the key pair may be generated during program startup. In one embodiment, the private key may be held only in volatile memory by the program, and the public key may be added to the security asset repository as part of creating the user in the security asset repository at the request of the program or person that is starting the program. In this case, all three participants may take part in the user provisioning process during program startup: the program being started, the security asset service with underlying security asset repository, and the program or person starting the program. In this way, a three-way user provisioning process may be implemented.

In various embodiments, any number of cryptographic algorithms, key lengths, and modes may be used including, SHA-384, HMAC with SHA-384, ECDSA (NIST curve P-384), ECDH (NIST curve P-384) using the NIST One-Pass Diffie-Hellman Scheme, NIST Concatenation Key Derivation Function, and/or AES with 256-bit keys in Galois/Counter Mode (GCM), etc.

In various embodiments, the systems and methods described herein may function to allow modifying algorithms, key lengths, mode, padding schemes and other parameters as the state of the art advances, weaknesses are discovered, or to fit implementation requirements.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
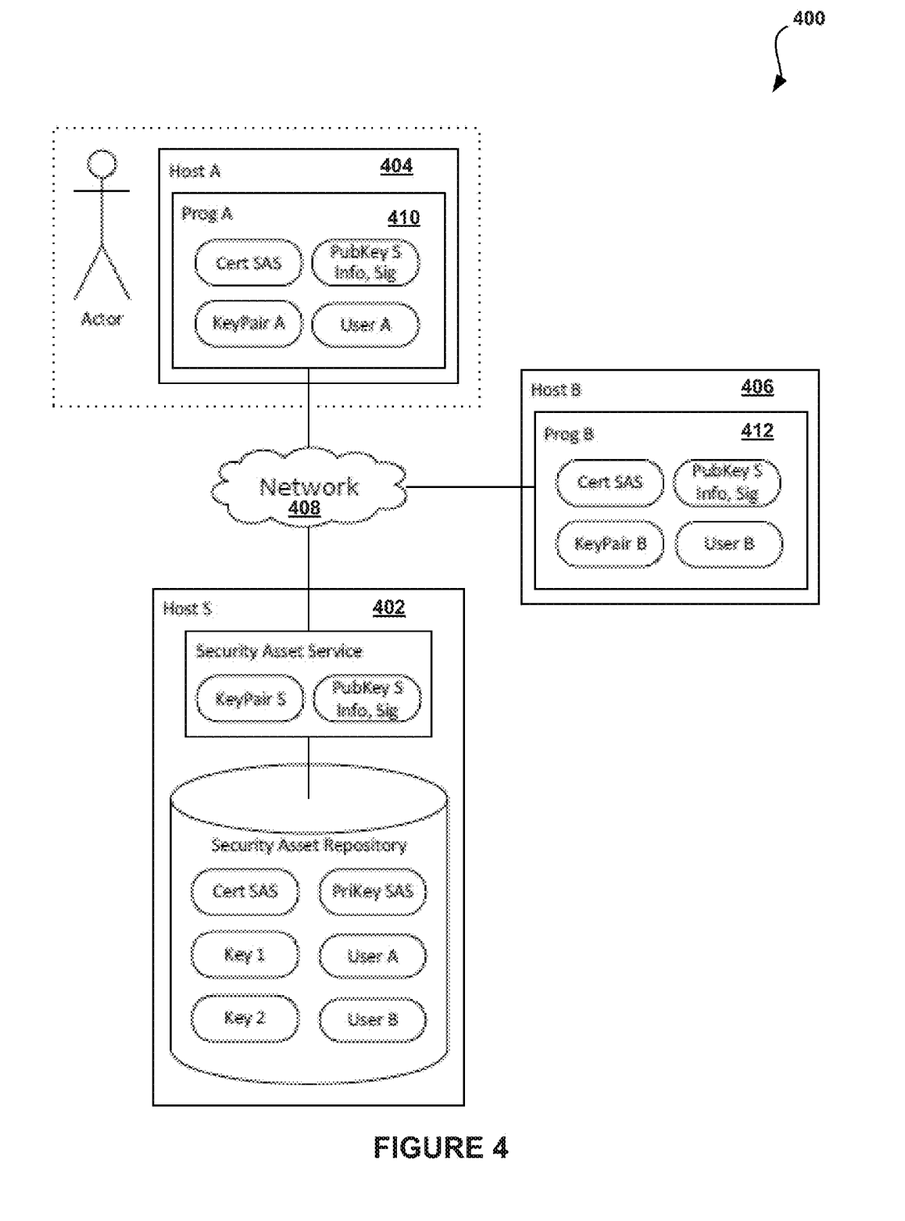
FIG. 4 illustrates a system for managing user access credentials in a computer network, in accordance with one embodiment.

FIG. 4 illustrates a system 400 for managing user access credentials in a computer network, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

As shown, the system 400 includes a first computer 402, a second computer 404, and a third computer 406, which are capable of communicating over a network 408. In various embodiments, the network environment illustrated in FIG. 4 may use virtualization techniques or may be a cloud environment, etc.

The second computer 404 ("Host A") includes a first program 410 ("Program A"), which is a daemon management program that is used to start a second program 412 ("Program B") on the third computer 406 ("Host B"), where the second program 412 is a daemon. The Security Asset Service (SAS) is running on the first computer 402 ("Host S").

A user, termed an "actor", has physical access to the second computer 404 but not the third computer 406. The actor starts program A and enters a username and password that is already known by the SAS, which program A uses to provision itself in the SAS.

Once program A is known as user A to the SAS, program A can start program B on host B and can coordinate provisioning of user B in the SAS so that program B can retrieve the security credentials it needs from the SAS while it is running, such as key 1 and key 2 as represented in the Security Asset Repository. It is appreciated that once user A is provisioned in the SAS, program A no longer needs to interact with the actor to start other programs or to retrieve security assets from the SAS, and program A does not need to retain the actor's password.

Figure 5:
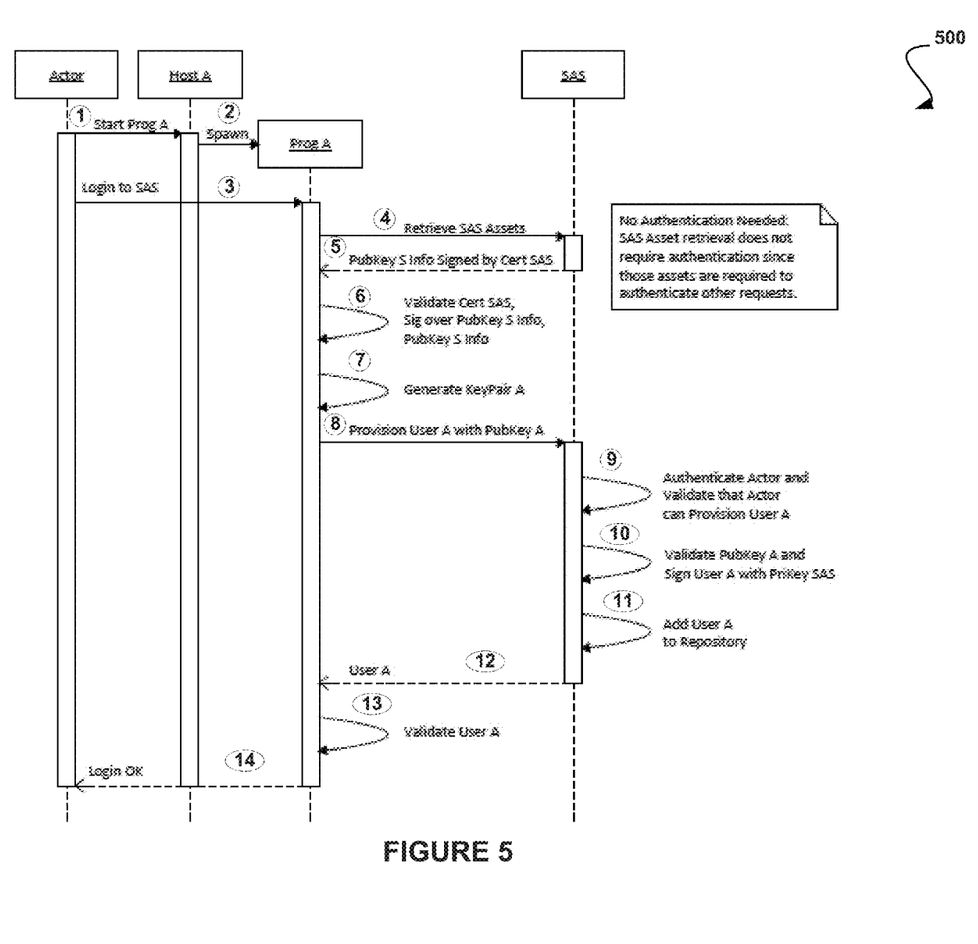
FIG. 5 illustrates a flow diagram for permitting a program to provision itself in a security asset service as part of a program start-up, in accordance with one embodiment.
Figure 6:
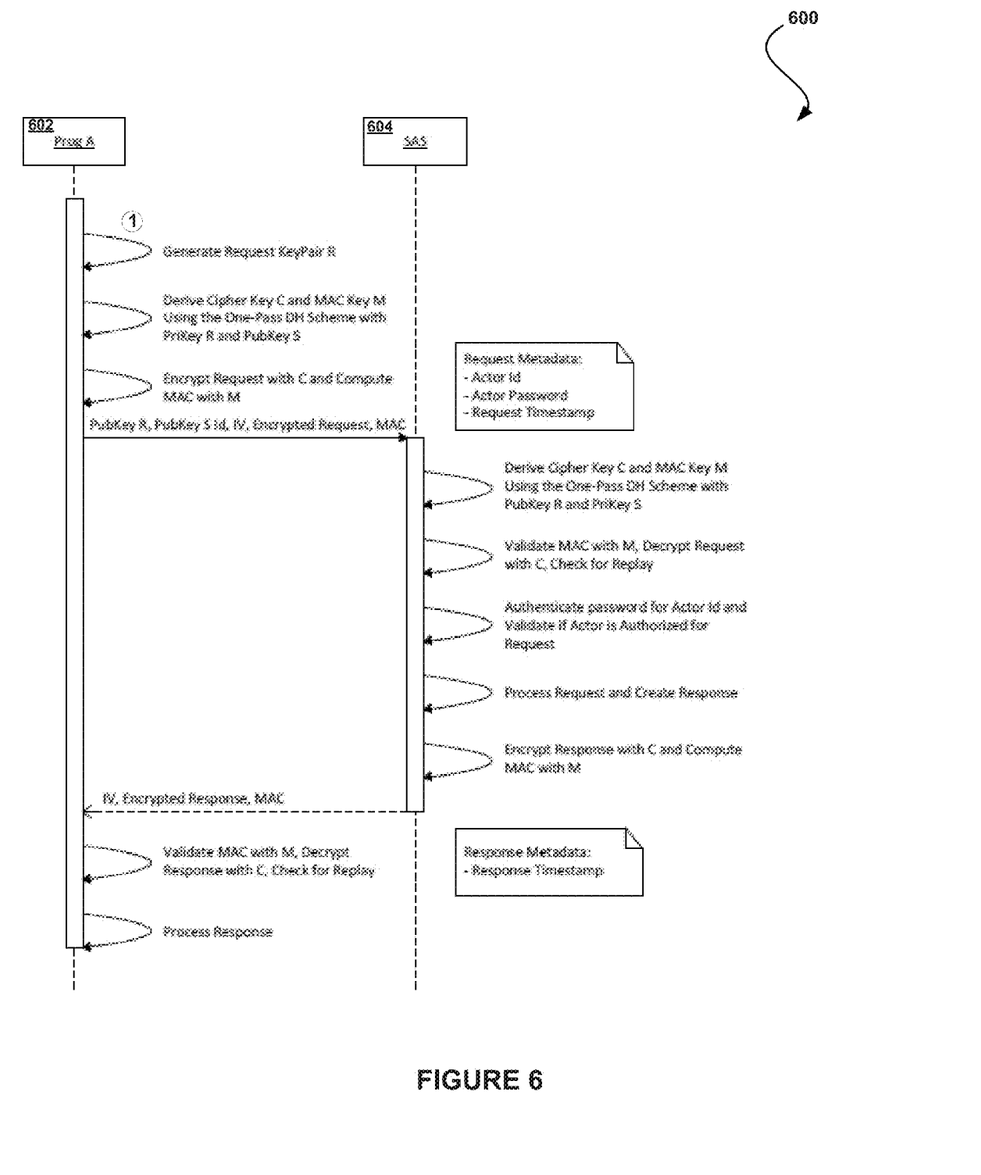
FIG. 6 illustrates a flow diagram for permitting a program to provision itself in a security asset service as part of a program start-up, in accordance with one embodiment.

One technique by which program A may provision itself in the SAS is shown in FIGS. 5 and 6.

FIG. 5 illustrates a flow diagram 500 for permitting a program to provision itself in a security asset service as part of the program start-up, in accordance with one embodiment. As an option, the flow diagram 500 may be implemented in the context of the details of FIGS. 1-4. Of course, however, the flow diagram 500 may be implemented in the context of any desired environment. Further, the aforementioned definitions may equally apply to the description below.

As shown, a user starts program A and the host computer A spawns program A. See steps 1 and 2. The user then logs into to the SAS. See step 3.

Before program A can provision itself in the SAS with the actor's credentials, such as a username and password, it must retrieve the SAS X.509v3 certificate and the current key to use to encrypt requests. See step 4. The SAS assures that this is the current key by signing it with the private key that corresponds to the SAS certificate. See step 5. Authentication is not needed, as these SAS security assets need not be secret.

In one embodiment, program A may validate the SAS certificate by validating the certification path as described by IETF standards (RFC 5280 or later), including ensuring that the hostname it used to connect to the SAS matches the subject or subject alternative name, that the "digitalSignature" bit is set in the key usage extension, and that the "id-kpserverAuth" key usage purpose is indicated by the extended key usage extension.

Additionally, program A may verify that the signature on the public key information, "PubKey S Info," was made by the SAS certificate. In this case, PubKey S Info may include an identifier, termed an "ID", as well as "notBefore" and "notAfter" timestamps. Program A may also verify that the ID is present and apply implementation checks, such as a check for a correct length and character set. Program A may also check that its own clock is not before and not after the timestamps.

In one embodiment, it may be the responsibility of the program to check for a new PubKey S from the SAS and to start using it before the current PubKey S expires. Finally, program A may validate the public key ("PubKey S") to ensure that it is a real public key with an acceptable algorithm, length, and parameters. See step 6.

In one embodiment, the SAS may generate a key pair to service every request instead of reusing the PubKey S. In that case, the key agreement may follow the full Ephemeral Unified Model instead of only partially following it by reusing PubKey S. This would provide forward secrecy on both the client and server side. However, forward secrecy on the client side provided by generating a new KeyPair R for every request and a partial perfect forward secrecy by periodically rotating to a new KeyPair S is a good compromise to get a mostly one-pass protocol.

Once the SAS assets have been validated, program A generates KeyPair A that will become the basis of User A provisioned in the SAS. See step 7. In one embodiment, program A may use the same algorithm, length, and parameters as that of the public key in the SAS certificate, but any reasonable choice that would be accepted by the SAS is sufficient. Extra fields may need to be added to the request message so that the SAS knows what kind of key was generated, if the implementation does not generate the same kind of key as held by the SAS certificate.

With KeyPair A generated, a user provisioning request is created to be sent to the SAS, authenticating with the actor's credentials. See step 8. The actor's username may also be known as the "actorId". In addition to the noted request metadata comprising actorId, actorPassword, requestTimestamp, the user provisioning request may contain "PubKey A" and authorization information.

The SAS should be able to decide which users should have access to which assets in the SAR, including the kind of access such as, for example, to create, read, update, delete, and execute. In one embodiment, authorization models may use a hierarchical group based ACLs on a tree security asset structure. The SAS may also determine whether the actor's credentials permit adding the user being provisioned to the requested ACLs.

There may be no benefit to provision a user to the SAS without that user being able to access security assets from the SAS. On the other hand, it may not be reasonable to have access to all assets from the SAS. Accordingly, a reasonable authorization model may be chosen to fit implementation requirements, and the user provisioning request should accommodate that authorization model.

In order to send a provisioning request, an ephemeral key pair may be created (e.g. KeyPair R, as shown in step 1 of FIG. 6, for example). In one embodiment, this creation may follow the One-Pass Diffie-Hellman scheme. The user ID may be generated by the SAS while the user is being provisioned in the SAR during processing of the provisioning request. The user return value may be composed of a creation timestamp, the user ID, and a signature over those values by PriKey SAS. After program A receives User A from the SAS in the response to the user provisioning request, it validates that the signature was indeed created by SAS certificate.

Accordingly, as shown, the SAS authenticates the user and validates the PubKey A. See steps 9 and 10. Further, the SAS adds User A to the SAR. See step 11. User A is then validated by program A and a successful login notification is presented to the user. See steps 12-14.

In one embodiment, the implementation may base the message format on JavaScript Object Notation (JSON) and the replay mechanism on an in-memory map of MAC values from requests with recent request timestamps. MAC values in the map may be discarded when the corresponding request timestamp is older than a preconfigured amount of time. Messages with request timestamps older than that preconfigured value may be rejected during the replay check.

FIG. 6 illustrates a flow diagram 600 for permitting a program to provision itself in a security asset service as part of the program start-up, in accordance with one embodiment. As an option, the flow diagram 600 may be implemented in the context of the details of FIGS. 1-5. Of course, however, the flow diagram 600 may be implemented in the context of any desired environment. Further, the aforementioned definitions may equally apply to the description below.

FIG. 6 shows a simplified flowchart illustration of how passwords can be used to authenticate the security asset service, showing details of password authentication not illustrated in FIG. 5 (e.g. for simplicity, etc.), in accordance with one embodiment. At the end of the sequence described by FIGS. 5 and 6, program A 602 is able to request security assets from the SAS 604 using a key based authentication technique described by FIGS. 7 and 8, instead of needing a password to authenticate as described by FIGS. 5 and 6.

Figure 7:
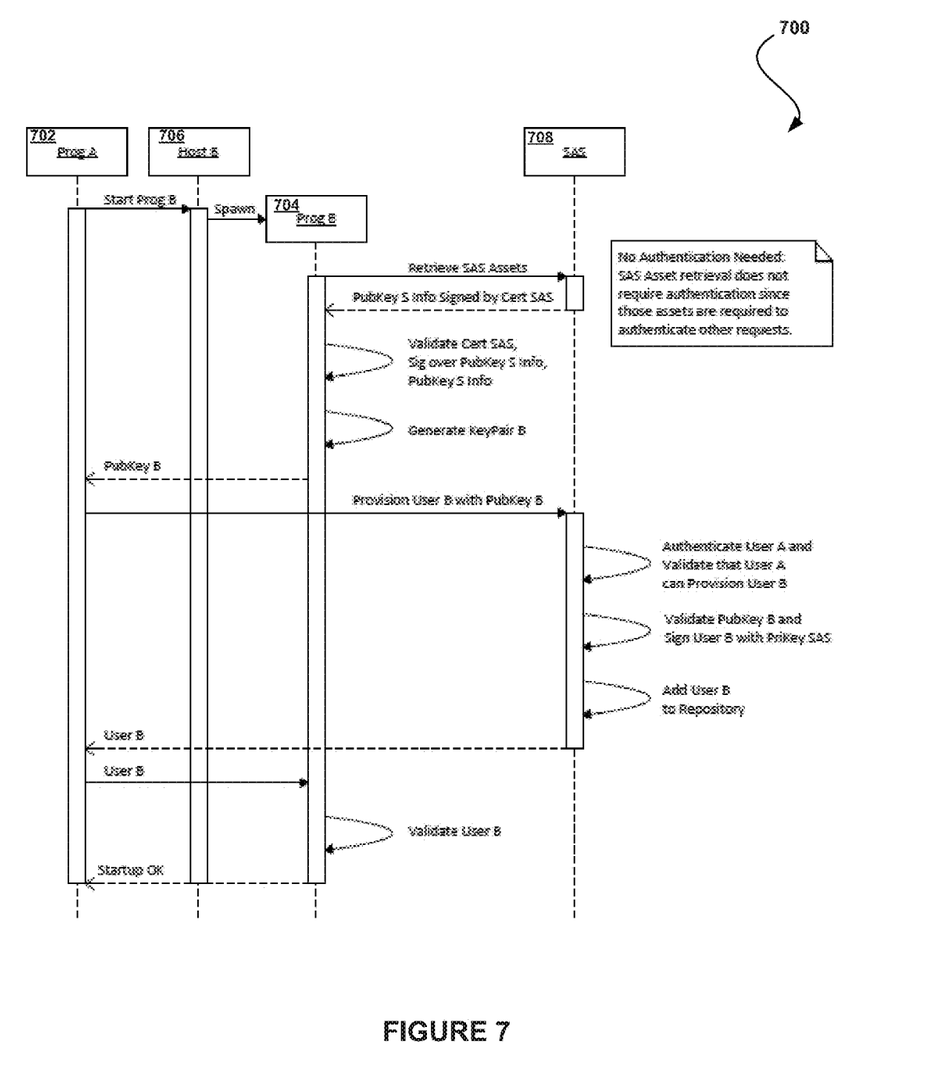
FIG. 7 is a flowchart illustration of a non-interactive program starting another program on another host to provision a user in the Security Asset Service (SAS), in accordance with one embodiment.

The provisioning of users in the SAS is achieved in a non-interactive manner. FIG. 7 is a simplified flowchart illustration 700 of a non-interactive program starting another program on another host to provision a user in the Security Asset Service so that the program being started can access security assets through the SAS, in accordance with one embodiment. As an option, the flowchart illustration 700 may be implemented in the context of the details of FIGS. 1-6. Of course, however, the flowchart illustration 700 may be implemented in the context of any desired environment.

FIG. 7 shows how program A 702 can start program B 704 (of a Host B 706) and coordinate provisioning of User B so that program B can then retrieve security assets from the SAS 708. Program A and B may carry out a multi-pass dialog before program B completes startup. This is different from how most programs are started and requires the program's startup sequence to accommodate multi-pass dialog.

Once program B supports this multi-pass dialog for startup and ends up with KeyPair B and User B in its volatile memory, instead of reading security assets from the file system, it can request them from the SAS. If this is integrated in a host provisioning process, this results in a security asset management scheme where no security assets need to be unnecessarily put at risk. This is especially attractive in a cloud environment where hosts may be automatically provisioned and deprovisioned.

In one embodiment, users may be deprovisioned in the SAS just as easily as they were provisioned, as long as the program controlling that process sends a request to deprovision that user as part of the larger deprovisioning process, or the program can deprovision itself as part of cleaning up prior to the program shutting down. Should the program be restarted, the same user in the SAS may be updated with the new public key. This means that user identifiers may be reused and key management can be cleanly handled. However, auditing may dictate requirements that a new user identifier be generated each time a key pair is generated. Those details are left to the implementation's requirements.

The techniques and systems described herein rely on the security of the underlying network service that programs use to remotely connect to hosts to start other programs. Typically, those remote login programs that offer such network services make use of cryptography and need to manage security assets themselves. With sufficient integration with those network services and the host provisioning flow that manages those network services, even such services could use the SAS to access security assets.

Figure 8:
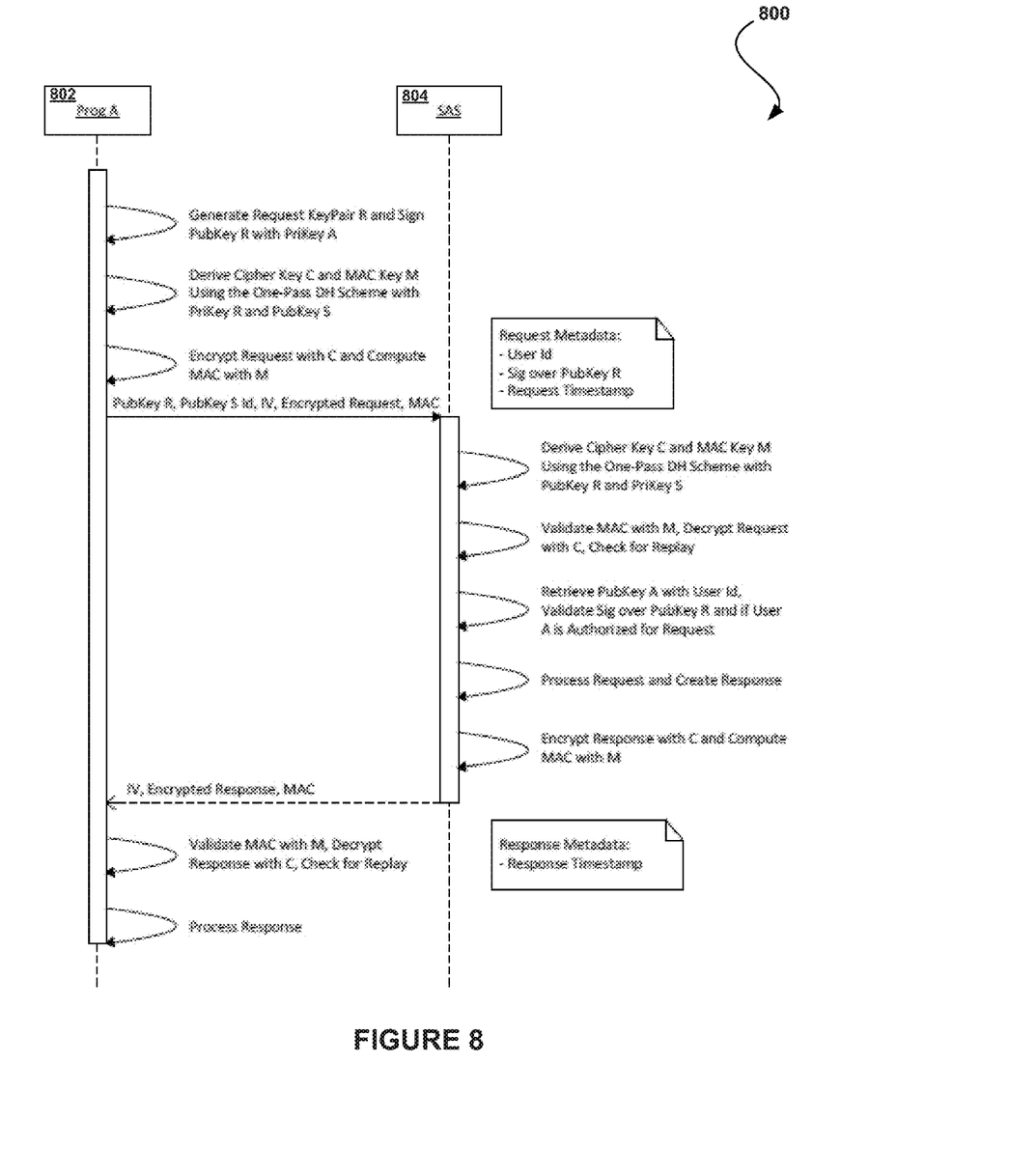
FIG. 8 is a simplified flowchart illustration of how keys can be used to authenticate to a Security Asset Service, in accordance with one embodiment.

FIG. 8 is a simplified flowchart illustration 800 of how keys can be used to authenticate to the SAS, in accordance with one embodiment, showing details of key authentication not illustrated in FIG. 7. As an option, the flowchart illustration 800 may be implemented in the context of the details of FIGS. 1-7. Of course, however, the flowchart illustration 800 may be implemented in the context of any desired environment. In operation, program A 802 may utilize keys to authenticate to the SAS 804.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for maintaining a Security Asset Repository (SAR) on a first computer connected to a network, the SAR being operable for storing user credentials to access resources on the network;
   computer code for executing, by a user, a first program residing on a second computer connected to the network, the user having first user access credentials for accessing the second computer;
   computer code for, in response to executing the first program, accessing the SAR by the first program, by employing second user access credentials provided to the first program by the user;
   computer code for, in response to accessing the SAR by the first program, retrieving and validating, by the first program at the second computer, third user access credentials from the SAR, the third user access credentials being operable for accessing the SAR by a third computer which is different from the second computer and is not physically accessible by said user;
   computer code for, in response to retrieving the third user access credentials from the SAR, executing, by the first program, a second program residing on the third computer connected to the network, and providing the third user access credentials to the second program; and computer code for, in response to providing the third user access credentials to the second program at the third computer, accessing the SAR on the first computer by the second program by employing the third user access credentials, and retrieving, by the second program, fourth user access credentials from the SAR, the fourth user access credentials being operable for accessing said resources on the network other than the SAR.

2. The computer program product of claim 1, wherein the computer program product is operable such that the first user access credentials include at least a username and password.

3. The computer program product of claim 1, wherein the computer program product is operable such that the second user access credentials include at least a username and password.

4. The computer program product of claim 1, wherein the computer program product is operable such that the third user access credentials includes at least a public key.

5. The computer program product of claim 1, wherein the computer program product is operable such that the fourth user access credentials includes at least a public key.

6. The computer program product of claim 1, wherein the computer program product is operable such that retrieving the third user access credentials from the SAR includes retrieving a current key to use to encrypt requests.

7. The computer program product of claim 1, wherein the computer program product is operable such that retrieving the third user access credentials from the SAR includes retrieving an SAS certificate and a current key.

8. The computer program product of claim 7, further comprising computer code for validating the SAS certificate, by the second computer.

9. The computer program product of claim 7, further comprising computer code for validating the current key, by the second computer.

10. The computer program product of claim 7, further comprising computer code for generating a first key pair, by the second computer, in response to retrieving the SAS certificate and the current key.

11. The computer program product of claim 10, further comprising computer code for provisioning the user, at the first computer utilizing at least a portion of the first key pair.

12. The computer program product of claim 1, wherein the computer program product is operable such that retrieving the fourth user access credentials from the SAR includes retrieving an SAS certificate and a current key.

13. The computer program product of claim 12, further comprising computer code for generating a second key pair, by the third computer, in response to retrieving the SAS certificate and the current key.

14. The computer program product of claim 1, wherein the computer program product is operable such that the user is located at a physical location of the second computer.

15. The computer program product of claim 14, wherein the computer program product is operable such that the physical location of the second computer is different than a physical location of the third computer, such that the user does not have physical access to the third computer.

16. The computer program product of claim 1, wherein the computer program product is operable such that the first program includes a daemon management program.

17. The computer program product of claim 1, wherein the computer program product is operable such that the second program includes a daemon.

18. The computer program product of claim 1, wherein the computer program product is operable such that the SAR is associated with a Security Asset Service (SAS) corresponding to the first computer.

19. A method, comprising:
maintaining a Security Asset Repository (SAR) on a first computer connected to a network, the SAR being operable for storing user credentials to access resources on the network;
executing, by a user, a first program residing on a second computer connected to the network, the user having first user access credentials for accessing the second computer;
in response to executing the first program, accessing the SAR by the first program, by employing second user access credentials provided to the first program by the user;
in response to accessing the SAR by the first program, retrieving and validating, by the first program at the second computer, third user access credentials from the SAR, the third user access credentials being operable for accessing the SAR by a third computer which is different from the second computer and is not physically accessible by said user;
in response to retrieving the third user access credentials from the SAR, executing, by the first program, a second program residing on the third computer connected to the network, and providing the third user access credentials to the second program; and
in response to providing the third user access credentials to the second program at the third computer, accessing the SAR on the first computer by the second program by employing the third user access credentials, and retrieving, by the second program, fourth user access credentials from the SAR, the fourth user access credentials being operable for accessing said resources on the network other than the SAR.

20. A system comprising:
a memory system; and
one or more processing cores comprising one or more hardware processor(s) coupled to the memory system and that are each configured to:
maintain a Security Asset Repository (SAR) on a first computer connected to a network, the SAR being operable for storing user credentials to access resources on the network;
execute, by a user, a first program residing on a second computer connected to the network, the user having first user access credentials for accessing the second computer;
in response to executing the first program, access the SAR by the first program, by employing second user access credentials provided to the first program by the user;
in response to accessing the SAR by the first program, retrieving and validating, by the first program at the second computer, third user access credentials from the SAR, the third user access credentials being operable for accessing the SAR by a third computer which is different from the second computer and is not physically accessible by said user;
in response to retrieving the third user access credentials from tile SAR; execute, by tile first program, a second program residing on the third computer connected to the network, and providing the third user access credentials to the second program; and
in response to providing the third user access credentials to the second program at the third computer, access the SAR on the first computer by the second program by employing the third user access credentials, and retrieving, by the second program, fourth user access credentials from the SAR, the fourth user access credentials being operable for accessing said resources on tile network other than tile SAR.

* * * * *